United States Patent [19]

Iwatsuki

[11] Patent Number: 5,133,227

[45] Date of Patent: Jul. 28, 1992

[54] METHOD OF POWER-ON DOWNSHIFTING OF AUTOMATIC TRANSMISSION INTERRELATED WITH TEMPORARY TORQUE DOWN OF ENGINE

[75] Inventor: Kunihiro Iwatsuki, Toyota, Japan

[73] Assignee: Toyota Jidosha Kabushiki Kaisha, Aichi, Japan

[21] Appl. No.: 674,223

[22] Filed: Mar. 25, 1991

[30] Foreign Application Priority Data

Mar. 26, 1990 [JP] Japan ................................ 2-75868

[51] Int. Cl.$^5$ .............................................. B60K 41/10
[52] U.S. Cl. .................................. 74/859; 74/851/858
[58] Field of Search ........................ 74/858, 859, 851; 475/285

[56] References Cited

U.S. PATENT DOCUMENTS

| | | | |
|---|---|---|---|
| 3,939,738 | 2/1976 | Adey et al. | 74/859 |
| 4,226,141 | 10/1980 | Espenschied | 74/859 X |
| 4,266,447 | 5/1981 | Heess et al. | 74/858 |
| 4,355,550 | 10/1982 | Will et al. | 74/858 X |
| 4,370,903 | 2/1983 | Stroh et al. | 74/858 |
| 4,403,527 | 9/1983 | Mohl et al. | 74/851 |
| 4,455,890 | 6/1984 | Kuramochi et al. | 475/285 X |
| 4,493,228 | 1/1985 | Vukovich et al. | 74/859 X |
| 4,528,869 | 6/1985 | Kubo et al. | 475/285 X |
| 4,680,988 | 7/1987 | Mori | 74/858 X |
| 4,819,187 | 4/1989 | Yasue et al. | 364/424.1 X |
| 4,884,471 | 12/1989 | Daggett et al. | 475/285 |
| 4,938,100 | 7/1990 | Yoshimura et al. | 74/858 X |

FOREIGN PATENT DOCUMENTS

| | | | |
|---|---|---|---|
| 3913191 | 11/1989 | Fed. Rep. of Germany | 74/858 |
| 56-43606 | 1/1982 | Japan | 475/285 |
| 61-18528 | 1/1986 | Japan . | |

OTHER PUBLICATIONS

SAE Technical Paper Series-Microcomputer Controlled Automatic Transmissions-Miller-Borg-Warner Research Center, Des Plaines, Ill., pp. 119-131.

Primary Examiner—Leslie A. Braun
Assistant Examiner—David E. Henn
Attorney, Agent, or Firm—Oliff & Berridge

[57] ABSTRACT

In a downshifting of an automatic transmission with an engine being generally maintained in a substantial power generating condition in a vehicle, the output torque of the engine is decreased by an amount prior to a substantial establishment of a torque transmitting route in the automatic transmission for a shifted down speed stage, and then the output torque of the automatic transmission is repetitively monitored at a certain small scanning cycle after the start of establishing the torque transmitting route in the automatic transmission for the shifted down speed stage, while the monitored output torque of the automatic transmission is repetitively compared with a target value determined therefor at the scanning cycle, thereby progressively recovering the output torque of the engine at the scanning cycle by an amount corresponding to the repetitive comparison of the monitored output torque of the automatic transmission with the target value determined therefor so as to cancel a difference in each comparison.

6 Claims, 4 Drawing Sheets

METHOD OF POWER-ON DOWNSHIFTING OF AUTOMATIC TRANSMISSION INTERRELATED WITH TEMPORARY TORQUE DOWN OF ENGINE

BACKGROUND OF THE INVENTION

1. Field of the Invention

The present invention relates to a control of an automatic transmission in a vehicle, and more particularly, to a control of a combination of an engine and an automatic transmission in a vehicle for downshifting the automatic transmission with the vehicle engine continuing to generate substantial power output.

2. Description of the Prior Art

When an automatic transmission in a vehicle is shifted between speed stages according to running conditions of the vehicle such as the running speed of the vehicle and the power output of the engine, the route of transmitting torque in the torque transmission mechanism in the transmission is changed over from one to another thereof available according to selective engagement and disengagement of clutches, brakes and one way clutches incorporated in the transmission. In order to accomplish the changing over of speed stages smoothly with no abrupt change in the output torque of the transmission it is generally desirable that the output torque of the engine is low while the speed stage shifting proceeds. In view of this it has already been proposed to decrease the engine output torque temporarily during the speed stage shifting, particularly in a power-on downshifting in which the transmission is shifted down with the engine being kept on in a substantially power generating condition, as described in Japanese Patent Laid-open Publication 61-18528. In this prior art the recovery of the temporarily decreased engine output torque is controlled depending upon a timer.

On the other hand, it has also been proposed to control friction engaging means such as clutches and brakes by monitoring the output torque of the transmission so that the value of the transmission output torque is brought into coincidence with a target value determined therefor in order to improve the shifting performance of the transmission such as described in SAE Paper 820394. This art is self contained in the control of the automatic transmission.

SUMMARY OF THE INVENTION

Although it is certainly effective to decrease the engine output torque temporarily during the speed stage shifting of an automatic transmission from the point of view of lessening the abrupt change in the output torque of the transmission, such a reduction of engine output power, even when it is only temporary, can substantially damage the power performance of the vehicle, particularly when the transmission is shifted down with the accelerator pedal being kept depressed because of a need for a substantial engine power output, if the temporary reduction in the engine output power is not appropriately controlled according to the progress of speed stage shifting in the transmission mechanism.

In consideration of such problems in the art of temporarily decreasing engine output power during speed stage shifting of the automatic transmission in a vehicle, it is the object of the present invention to provide a method of controlling speed stage shifting of the automatic transmission in a functional relationship with a control of engine power output so that the advantage of temporarily decreasing engine output power from the view-point of lessening the abrupt change in the transmission output torque can be optionally and desirably compromised with the disadvantage thereof from the view-point of engine power performance.

According to the present invention the above-mentioned object is accomplished by a method of controlling a combination of an engine and an automatic transmission during vehicle in a downshifting of the automatic transmission with the engine being generally maintained in a substantial power generating condition, comprising the steps of:

decreasing output torque of the engine by a predetermined amount prior to a substantial establishment of a torque transmitting route in the automatic transmission for a shifted down speed stage thereof;

repetitively monitoring output torque of the automatic transmission at a certain small scanning cycle after the start of establishing the torque transmitting route in the automatic transmission for the shifted down speed stage thereof;

repetitively comparing at each scanning cycle the monitored output torque of the automatic transmission with a target value determined therefor;

and progressively recovering the output torque of the engine at each scanning cycle for an amount corresponding to the repetitive comparison of the monitored output torque of the automatic transmission with the target value determined therefor so as to cancel a difference in each comparison.

By relating the recovery of the temporarily decreased engine output torque directly with the recovery of the transmission output torque after a change over of speed stages and scheduling the the recovery of engine output torque in accordance with the scheduling of the recovery of the transmission output torque, the compromise between the advantage of temporarily decreasing engine output torque from the view-point of lessening the abrupt change in the transmission output torque and the disadvantage thereof from the view-point of engine power performance is available at any optionally desirable manner.

In the above-mentioned method of control, when the automatic transmission includes a one way clutch having a first rotational member connected with a rotational element in the automatic transmission that rotates continually in a certain rotational direction before and after the downshifting and a second rotational member connected with a rotational element in the automatic transmission that does not rotate before the downshifting but rotates in the certain rotational direction after the downshifting the one way clutch engaging to establish the shifted down speed stage when the second rotational member would rotate faster in the certain rotational direction than the first rotational member, the output torque of the engine may be decreased by the amount when the rotational speed of the second rotational member has approached the rotational speed of the first rotational member beyond a certain threshold value therefor, maintained substantially at the decreased output torque until the output torque of the automatic transmission increases beyond a certain threshold value therefor after the engagement of the one way clutch, and recovered thereafter.

Further, in the above-mentioned method of control, the target value for the output torque of the automatic transmission may be substantially linearly increased according to the scanning cycle.

BRIEF DESCRIPTION OF THE DRAWINGS

In the accompanying drawings.

DESCRIPTION OF THE PREFERRED EMBODIMENT

The present invention will now be described in more detail and respect to a preferred embodiment with reference to the accompanying drawings.

Figure 1:
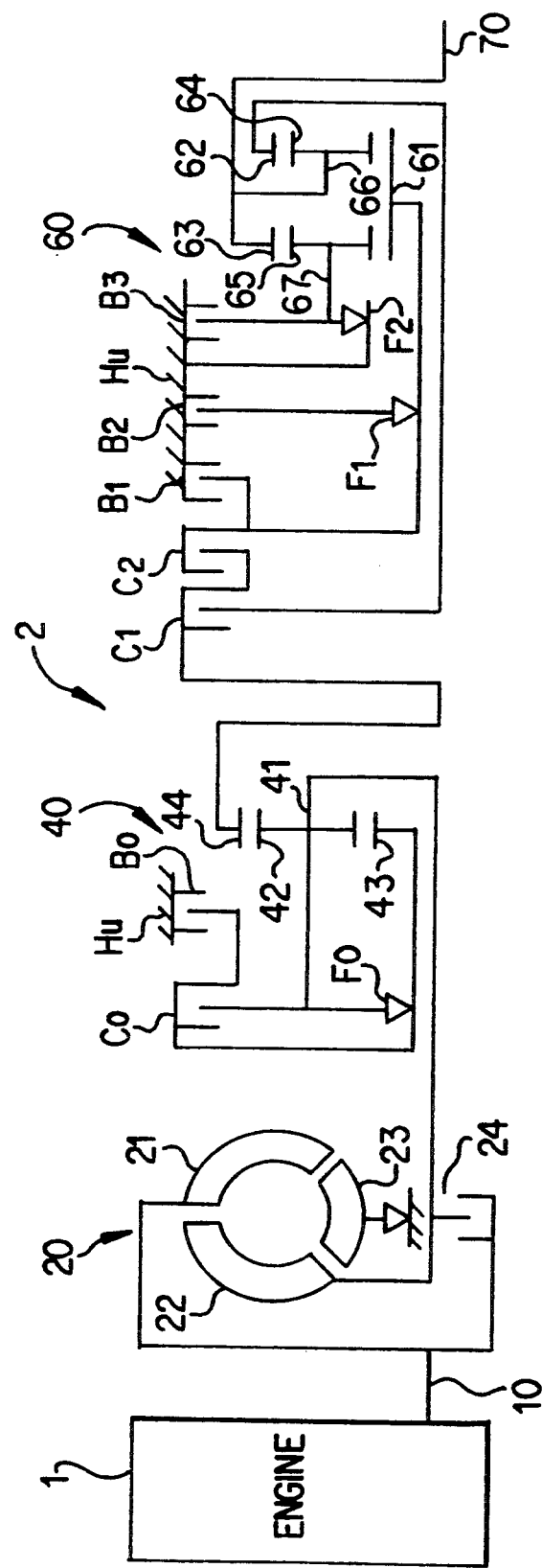
FIG. 1 is a diagrammatical illustration of a combination of an engine and an automatic transmission in a vehicle.

FIG. 1 diagrammatically illustrates a combination of an engine and an automatic transmission in a vehicle to which the downshift control according to the present invention may be applied. An engine 1 is power transmittingly connected with the vehicle drive wheels (not shown in the figure) through a transmission 2 which comprises a torque converter 20, of a conventional type, having a pump 21 connected with the engine 1 via an input shaft 10, a turbine 22, a stator 23, and a lock-up clutch 24 for selectively and directly connecting the pump 21 with the turbine 22. A first gear unit 40 includes a planetary gear mechanism having a sun gear 43, a ring gear 44, a planetary pinion 42, a carrier 41 connected with the turbine 22 of the torque converter 20, a clutch C0 for selectively connecting the sun gear 43 with the carrier 41, a brake B0 for selectively braking the sun gear 43 relative to a housing Hu and a one way clutch F0 for torque transmittingly connecting the sun gear 43 with the carrier 41 in only one rotational direction. A second gear unit 60 includes a first planetary gear mechanism having a sun gear 61, a ring gear 62, a planetary pinion 64, a carrier 66, a second planetary gear mechanism having the sun gear 61 in common with the first planetary gear mechanism, a ring gear 63, a planetary pinion 65 and a carrier 67, a clutch C1 for selectively connecting the ring gear 62 with the ring gear 44 of the first gears unit 40, a clutch C2 for selectively connecting the sun gears 61 with the ring gear 44 of the first gear unit 40, a brake B1 for selectively braking the sun gear 61 relative to the housing Hu, a series combination of a brake B2 and a one way clutch F1 for selectively braking the sun gear 61 only in one rotational direction when the brake B2 is engaged, a brake B3 for selectively braking the carrier 67 relative to the housing Hu, and a one way clutch F2 for braking the carrier 67 relative to the housing Hu in only one rotational direction, wherein the carrier 66 and the ring gear 63 are connected with one another and with an output shaft 70 of the transmission.

Figure 2:
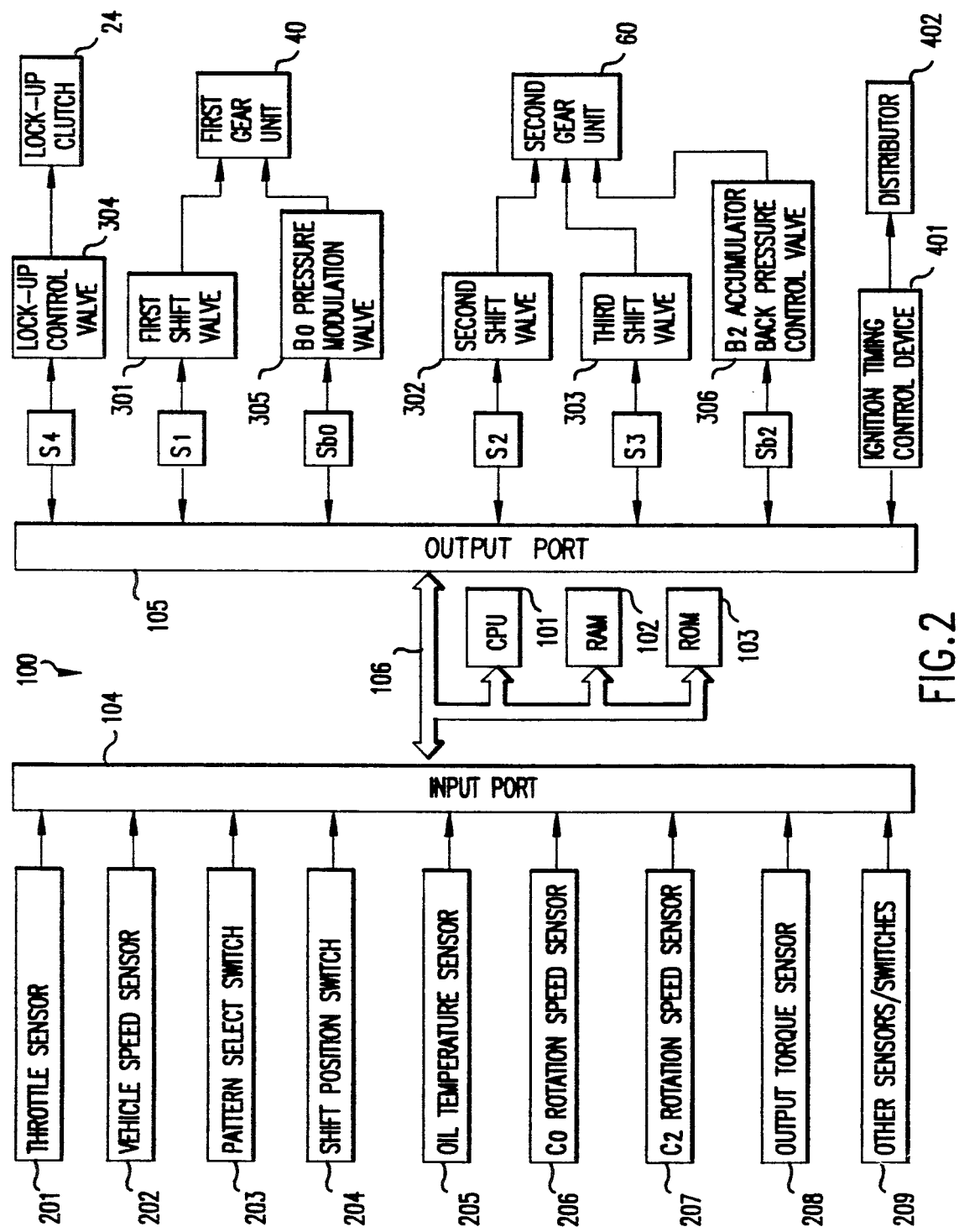
FIG. 2 is a diagrammatical illustration of a control system for changing over the gear train shown in FIG. 1 for various speed stages with a simultaneous modification of engine output torque according to the present invention.

The clutches C0, C1 and C2 and the brakes B0, B1, B2 and B3 may be hydraulically operated to be engaged or disengaged by an electro-hydraulic control system, the general concept of which is well known in the art, in such a manner that solenoid-operated change-over vales change over supply and exhaust of hydraulic pressure to and from the respective clutches and brakes under the control of an electronic control unit. FIG. 2 shows such an electro-hydraulic control system in a diagrammatical illustration with the respect to some components thereof relevant to the description of the present invention, wherein certain components are more relevant to the present invention as described hereinunder.

The tandem connection of the first gear unit 40 and the second gear unit 60 may be controlled according to the conventional method to provide four forward speed stages by the second gear unit 60 being changed over between three different gear ratios while the first gear unit 40 is maintained in its lower gear stage to provide 1st, 2nd and 3rd speed stages. By changing the first gear unit 40 its higher gear stage, while the second gear unit 60 is maintained at the 3rd speed stage, the 4th speed stage is provided as an overdrive stage. (Of course a reverse stage is also provided as is well known in the art.) Alternatively, the tandem connection of the first gear unit 40 and the second gear unit 60 (shown in FIG. 1) may be controlled by the electro-hydraulic control unit shown in FIG. 2 so as to provide six forward speed stages by on and off combinations of the clutches C0–C2, the brakes B0–B3 and the one way clutches F1–F2 as shown in Table 1:

TABLE 1

| Range | Speed | C0 | B0 | C1 | C2 | B1 | B2 | B3 | F0 | F1 | F2 |
|---|---|---|---|---|---|---|---|---|---|---|---|
| R | — | o |   |   | o |   | o | o |   |   |   |
| D | 1st | o |   | o |   |   |   |   | o |   | o |
| D | 2nd |   | o | o |   |   |   |   |   |   | o |
| D | 3rd | o |   | o |   |   | o |   | o | o |   |
| D | 4th |   | o | o |   |   | o |   |   | o |   |
| D | 5th | o |   | o | o |   | o |   | o |   |   |
| D | 6th |   | o | o | o |   | o |   |   |   |   |
| 2 | 1st | o |   | o |   |   |   |   | o |   | o |
| 2 | 2nd |   | o | o |   |   |   | o |   |   | o |
| L | 1st | o |   | o |   |   |   | o | o |   | o |

In the above table, "o" indicates that the clutch, brake or one way clutch is engaged at the corresponding speed stage under the corresponding shift range.

As is reflected in the above table, the first gear unit 40 is changed over from the lower gear stage, having a larger reduction gear ratio, to the higher gear stage, having a smaller reduction gear ration, during upshifting from the 1st to the 2nd speed stage, from the 3rd to the 4th speed stage and from the 5th to the 6th speed stage. Conversely, it is changed over from the higher gear stage to the lower gear stage during upshifting from the 2nd to the 3rd speed stage and from the 4th to the 5th speed stage. During downshifting from the 6th speed stage to the 1st speed stage, through the intermediate speed stages, the clutches and the brakes are of course engaged or disengaged in a manner reverse to that during upshifting. So, for example, during downshifting from the 6th speed stage to the 5th speed stage, the brake B0, which has been engaged, is gradually disengaged and the clutch C0, which has been disengaged, is gradually engaged. In this case, however, since the one way clutch F0 is provided in parallel with the clutch C0, the progress rate of changing over of the gear stage from the 6th speed stage to the 5th speed stage, on time basis, may be substantially controlled by the rate of disengaging the brake B0 so that, as the brake B0 is gradually disengaged, the sun gear 43 is allowed to start and then to increase its speed of rotation speed until it catches the rotation of the carrier 41, whereupon the one way clutch F0 is automatically engaged to produce the 5th speed stage thereafter, the clutch C0 is engaged so as to complete the direct connection between the input and output members of the first gear unit 40 for both engine driving and engine braking.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components.

The electronic control unit 100 is supplied with various data through the input port means 104 such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as the R, N, D, 2 and L set by a manual level from a shift position switch 204, oil temperature from an oil temperature sensor 205, rotational speed of an outer drum of the clutch Co from a C0 rotation speed sensor 206, rotational speed of an outer drum of the clutch C2 from a C2 rotation speed sensor 207, output torque of the transmission from an output torque sensor 208 and other data from other sensors and/or switches or the like generally designated by 209.

In the electronic control unit 100, the CPU 101 conducts certain calculations including those described in detail hereinunder particularly according to the present invention based upon the data received from the sensors and/or switches and the programs stored in the ROM 103 in cooperation of the RAM 102, and outputs control signals to a hydraulic control means including various standard components not shown in the figure and particularly the following components:

S1 is a solenoid valve which controls, according to on and off thereof, the changing-over of a first shift valve 301 which in turn controls the supply and exhaust of oil pressure to and from the clutch C0 and the brake B0 of the first gear unit 40.

S2 and S3 are solenoid valves which control, according to on and off thereof, the changing-over of a second shift valve 302 and a third shift valve 303 which in turn control the supply and exhaust of oil pressure to and from the clutches C1 and C2 and the brakes B1, B2 and B3 of the second gear unit 60.

S4 is a solenoid valve which controls, according to on and off thereof, the change-over of a lock-up control valve 304 which in turn controls the supply and exhaust of oil pressure to and from the lock-up clutch 24.

Sb0 is a solenoid valve which controls, according to the periodical on and off thereof an opening of a B0 pressure modulation valve 305 which in turn controls the oil pressure in the brake B0 so that the pressure in the brake B0 is continually changed according to the duty ratio of the on and off of the solenoid valve Sb0.

Sb2 is a solenoid valve which controls, according to periodical on and off thereof, an opening of a B2 accumulator back pressure control valve 306 which controls back pressure in an accumulator for the brake B2 so that the speed of engagement or disengagement of the brake B2 is continually changed according to the duty ratio of the one and off cycle of the solenoid valve Sb2.

Further, the electronic control unit 100 also delivers a control signal for an ignition timing control device 401 which in turn controls a distributor 402 of the engine 1 so as to delay the ignition timing of the engine temporarily for the purpose of decreasing engine output torque in relation with changing over of the speed stages of the transmission as described in detail hereinunder.

The method of control of the combination of the engine and the automatic transmission according to the present invention will be described with respect to a power-on downshifting of the transmission from the 6th speed stage to the 5th speed stage during which, in the first gear unit 40 the brake B0 is disengaged while the clutch C0 is engaged so that the first gear unit 40 is changed over from its higher gear stage to its lower gear stage, while in the second gear unit 60 the clutches C1 and C2 and the brake B2 are kept engaged and the brakes B1 and B3 are kept disengaged so that the second gear unit 60 is internally locked up to provide a gear ratio of 1.00

The action of gradually exhausting oil pressure from the brake B0 (in fact a hydraulic chamber thereof) while gradually supplying oil pressure to the clutch C0 (in fact also a hydraulic chamber thereof) is generally well known in the art. In this connection, it is also well known in the art to relate the timing of the exhaustion of oil pressure from a brake B0 with the timing of the supply of oil pressure to a catch Co.

In addition to such conventional timing control of the supply or exhaust of oil pressure in the gear units, in the invention, the engine output torque is controlled to be in a controlled relationship with the changing over the speed stages as described in detail hereinunder.

Figure 3:
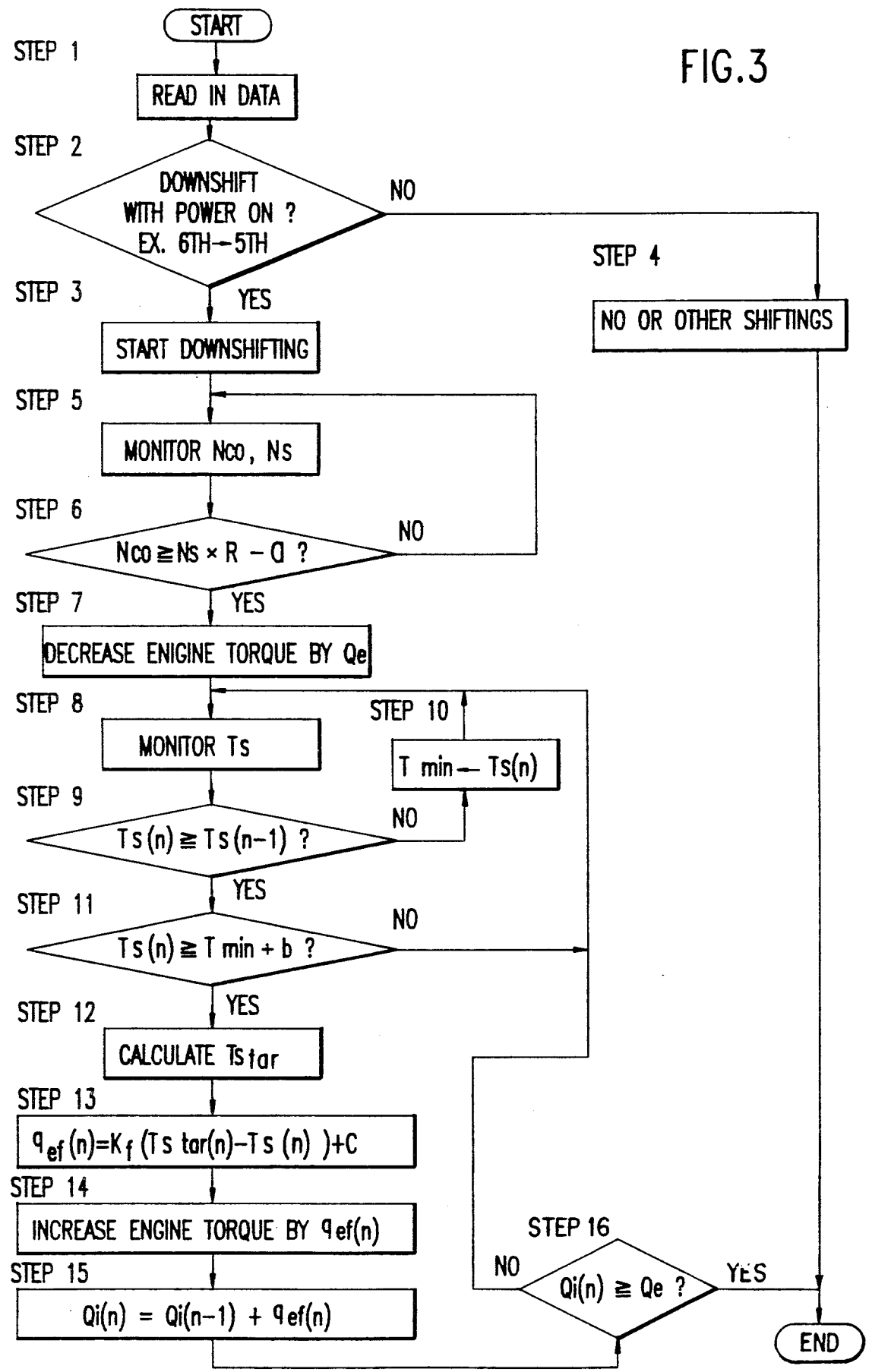
FIG. 3 is a flowchart illustrating a control process carried out according to the present invention.
Figure 4:
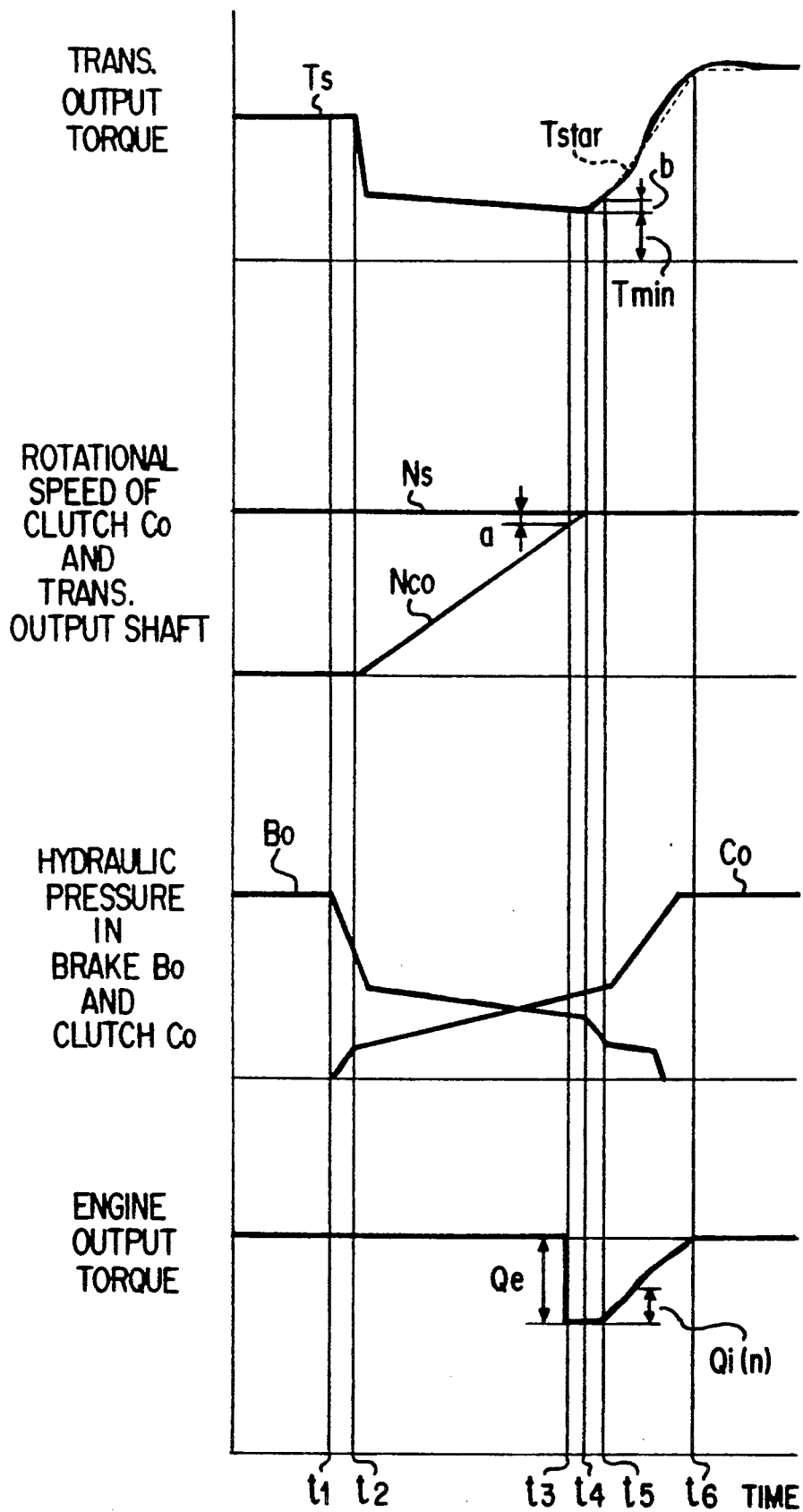
FIG. 4 is a diagram illustrating changes of various quantities in a power-on downshifting control carried out according to the present invention.

FIG. 3 shows the control process carried out by the control system shown during FIG. 2 in a power-on downshifting of the transmission shown in FIG. 1, using as an example of power-on downshifting, the downshifting from the 6th speed stage to the 5th speed stage and FIG. 4 is a diagram showing changes of various factors effected by the control process shown in FIG. 3.

Referring to FIG. 3, the control routine shown in the flowchart, is periodically repeated at a predetermined scanning cycle, such as several microseconds. When the control is started, in step 1 data are read in from the various sensors and switches (such as shown in FIG. 2) and control proceeds to step 2.

In step 2, it is judged, based upon the read in data, if the downshifting, in our example from the 6th speed stage to the 5th speed stage, is to be carried out with the engine in a power on condition. If the answer is YES, the control process proceeds to step 3 to carry out such downshifting, whereas if the answer is NO, the control process proceeds to step 4 for no shifting or shiftings under other conditions, with no substantial control procedure according to the present invention being carried out.

When the power-on downshifting from the 6th speed stage to the 5th speed stage has been started in step 3, the control process proceeds to 5 where and the rotational speed Nc0 of an outer race of the clutch C0, i.e. The rotational speed of the sun gear 43, and the rotational speed Ns of the transmission output shaft 70 are monitored. In the meantime, the hydraulic pressure in the brake B0 starts to decrease at time point t1, while the hydraulic pressure in the clutch C0 may also start to increase at the time point t1 when the hydraulic pressure in the brake B0 has lowered to a given level, as at time point t2, the output torque Ts of the output shaft 70 starts to decrease, while the outer race of the clutch C0 and an inner race of the one way clutch F0 start to rotate.

In step 6, it is judged if Nc0 is equal to or greater than Ns×R−a, wherein R is the current gear ratio of the second gear unit 60, which is 1.00 in the present example, and "a" is a predetermined amount such as shown in FIG. 4, before Nc0 has becomes substantially equal to Ns and indicates clutch F0 will soon become engaged. As long as the answer to the judgment in step 6 is NO, the control process returns before step 5, so that steps 5 and 6 are repeated at the predetermined scanning cycle. When the answer in step 6 is YES, at time point t3, the control process proceeds to step 7.

In step 7, the engine output torque is decreased by an amount Qe by the ignition timing being delayed by the ignition timing control device 401 acting on the distributor 402. The control process proceeds from step 7 to step 8.

In step 8, the output torque Ts of the transmission output shaft 70 is monitored. The value of Ts decreases starting at the time point t2 reflecting the lowering of the hydraulic pressure in the brake B0 below a predetermined level as shown in FIG. 4. Therefore, when the value of Ts during the current control scanning, Ts(n), is compared with that of the control scanning just preceding thereto, Ts(n−1), in step 9, the answer to the judgment in step 9 will be NO until Nc0 catches Ns at time point t4 and the one way clutch F0 engages. Until then, as long as the answer to the judgment in step 9 is NO, the control process proceeds to step 10, wherein the current value of Ts, i.e. Ts(n), is stored as Tmin, and then the control process returns to step 8, so that steps 8 through 10 are repeated at the predetermined scanning cycle. When the answer to the judgment in step 9 is YES, as at the time point t4, the control process proceeds to step 11.

In step 11, it is judged if the current value of Ts, i.e. Ts(n), is equal to or greater than Tmin+b, wherein "b" is a predetermined amount, such as shown in FIG. 4, of an increase in the engine output torque. After the engagement of the one way clutch F0 at the time point t4, the transmission output torque Ts starts to increase at a relatively moderate rate, shortly after the engine output torque has been decreased as by the amount Qe, thereby accomplishing the purpose of lessening the impact of engine output torque on transmission output torque which would otherwise be strong in the power-on downshifting of the transmission. However, the temporary reduction of the engine output torque must now be recovered to obtain the high performance desired as indicated by the power-on condition. The amount "b" is determined in view of the to compromise between the lessening of the impact due to the power-on downshifting and the protrusion of as quick a recovery of the engine output torque as possible. As long as the answer to the judgment in step 11 is NO, the control process returns to step 8 and repeats steps 8, 9 and 11. When the answer to the judgment in step 11 is YES, at time point t5, the control process proceeds to step 12.

In step 12, a target value T star, according to which the output torque Ts should increase toward recovery, is calculated as a basis of the schedule for the recovery of engine output torque which is considered to be most desirable in view of the compromise between the softening of the impact due to the power-on downshifting and the engine power performance. In the embodiment shown in FIG. 4, Tstar is determined to be increased at an approximately constant rate. When Tstar has been calculated, the control process proceeds to step 13, and an increment qef(n), for a gradual recovery of the engine output torque at that scanning cycle, is calculated depending upon the difference between Ts(n) and Tstar(n) plus any optional modification quantity "c", using qef(n) Kf(Tstar(n)-Ts(n))+c, with a proportioning factor Kf.

In step 14, the engine output torque is increased progressively by the calculated amount qef(n) for that scanning cycle. Then, in step 15 the state of recovery of the engine output torque, Qi(n), at that scanning cycle is determined as Qi(n)=Qi(n−1)+qef(n) and the control process proceeds to step 16.

In step 16, it is judged if Qi(n) is equal to or greater than Qe. As long as the answer in step 16 is NO, the control process returns to step 8 and repeats the steps 8 through 15. When the answer in step 16 has turned to YES as at time point t6, the control process is terminated as full engine output torque as been restored.

According to the control steps shown in FIG. 3 and described above, the torque in the transmission output shaft 70 changes moderately, as shown by the solid line in FIG. 4, under the corresponding temporary reduction control of the engine output torque, wherein the performance of variation of the output torque of the transmission and the performance of temporary reduction of the output torque of the engine are correlated with one another to achieve a compromise between the advantage of lessening the speed stage shifting shock, the shifting shock not completely avoidable in a power-on downshifting, and the disadvantage of losing the power performance for driving the vehicle.

Although the invention has been described in detail with respect to a preferred embodiment thereof, it will be apparent to those skilled in the art that various modifications are possible without departing from the scope of the present invention.

I claim:

1. A method of controlling a combination of an engine and an automatic transmission of a vehicle during downshifting of the automatic transmission with the engine being generally maintained in a substantial power generating condition, the automatic transmission operating with friction engagement means for establishment of a torque transmission route, comprising the steps of:

decreasing output torque of the engine by a predetermined amount prior to establishment of a torque transmission route in the automatic transmission for a speed stage after downshifting;

establishing the torque transmission route through initiation of a change in engagement or disengagement conditions of said engagement means;

repetitively monitoring output torque of the automatic transmission in a series of scanning cycles, each scanning cycle having a predetermined scanning cycle rate, after starting the step of establishing the torque transmission route in the automatic transmission for the speed stage;

calculating a target value for the output torque of the automatic transmission at each scanning cycle;

repetitively comparing at each scanning cycle the monitored output torque of the automatic transmission with each calculated target value for the output torque of the automatic transmission;

and progressively recovering the output torque of the engine at each scanning cycle by an amount based upon the repetitive comparison of each monitored output torque of the automatic transmission with each calculated target value.

2. A method according to claim 1, wherein the automatic transmission includes a one way clutch having a first rotational member connected with a rotational element in said automatic transmission adapted to rotate continually, said step of establishing the torque transmission route further comprises the steps of:

maintaining rotation of a first rotational member in a predetermined rotational direction before and after the downshifting;

initiating rotation of a second rotational member in the predetermined rotational direction after downshifting, the second rotational member connected with a rotational element in the automatic transmission adapted not to rotate before the downshifting; and engaging a one way clutch to establish the speed stage when the second rotational member catches the rotation speed in the predetermined rotational direction of the first rotational member, the step of decreasing the output torque of the engine by the predetermined amount occurring when the rotation speed of the second rotational member has approached within a second predetermined amount of the rotation speed of the first rotational member, and the output torque of the engine is substantially maintained at the decreased output torque until the monitored output torque of the automatic transmission increases beyond a value after the engagement of the one way clutch.

3. A method according to claim 1, wherein the step of calculating the target value for the output torque of the automatic transmission uses a substantially linear rate of increase.

4. A method of controlling a combination of an engine and an automatic transmission of a vehicle during downshifting with said engine being maintained in a substantial power generating condition, said automatic transmission operating friction engagement means adapted to be selectively engaged to bear a torque transmittance for establishing a predetermined speed stage comprising the steps of:

establishing a series of scanning cycles, each scanning cycle having a predetermined scanning cycle rate to repetitively monitor output torques of said engine and said automatic transmission after downshifting according to a change in engagement or disengagement conditions of at least one of said friction engagement means;

decreasing said output torque of said automatic transmission prior to establishment of predetermined speed stage;

decreasing said output torque of said engine by a predetermined amount to lessen said engine output torque on said automatic transmission;

calculating a target value for the output torque of said automatic transmission at each scanning cycle;

progressively recovering said output torque of said automatic transmission based on said target value; and progressively recovering said output torque of said engine at each scanning cycle by an amount based on repetitive comparison of said output torque of the automatic transmission and said target value.

5. A method according to claim 4, wherein said engagement means include a rotational member adapted not to rotate before said downshifting and said automatic transmission includes a rotational element adapted to rotate in a predetermined rotational directional before and after said downshifting, said steps of establishing a predetermined speed stage further comprising:

initiating rotation of said rotational member in said predetermined rotational direction when said output torque of said automatic transmission is decreasing;

repetitively monitoring rotational speeds of said rotational member and said rotational element;

progressively increasing said rotational speed of said rotational member, said step of decreasing said output torque of said engine by a predetermined amount occurring when said rotational speed of said rotational member is substantially near said rotational speed of said rotational element in said predetermined direction;

maintaining said output torque of said engine at a decreased level torque until said output torque of the automatic transmission increases beyond a threshold value.

6. A method according to claim 4, wherein said step of recovering said output torque of said automatic transmission is a substantially linear rate of increase.

* * * * *